United States Patent
Cleveland (10) Patent No.: US 7,505,427 B2
(45) Date of Patent: **\*Mar. 17, 2009**

(54) APPARATUS AND METHOD FOR IMPROVING SIGNAL-TO-NOISE RATIO IN A MULTI-CARRIER CDMA COMMUNICATION SYSTEM

(75) Inventor: Joseph R. Cleveland, Richardson, TX (US)

(73) Assignee: Samsung Electronics Co., Ltd., Suwon-si (KR)

(\*) Notice: Subject to any disclaimer, the term of this patent is extended or adjusted under 35 U.S.C. 154(b) by 666 days.

This patent is subject to a terminal disclaimer.

(21) Appl. No.: 10/841,256

(22) Filed: May 7, 2004

(65) Prior Publication Data

US 2005/0265274 A1    Dec. 1, 2005

(51) Int. Cl.
*H04B 7/216* (2006.01)
(52) U.S. Cl. ...................... 370/320; 375/148
(58) Field of Classification Search .............. 370/203; 455/134; 375/148; 329/304; 398/182
See application file for complete search history.

(56) References Cited

U.S. PATENT DOCUMENTS

| | | | |
|---|---|---|---|
| 5,825,241 A * | 10/1998 | Beale et al. ............... | 329/304 |
| 6,373,881 B1 * | 4/2002 | Mizuguchi et al. .......... | 375/147 |
| 7,158,560 B2 * | 1/2007 | Cleveland .................. | 375/148 |
| 2003/0147655 A1 * | 8/2003 | Shattil ...................... | 398/182 |
| 2005/0249109 A1 * | 11/2005 | Cleveland .................. | 370/203 |
| 2005/0250460 A1 * | 11/2005 | Cleveland .................. | 455/134 |

\* cited by examiner

*Primary Examiner*—Lester Kincaid
*Assistant Examiner*—Phuoc Doan (57) ABSTRACT

For use in a multi-carrier CDMA receiver, a noise reduction circuit for improving a signal-to-noise ratio of a multi-carrier signal corresponding to a predetermined sequence of chips. Each chip has a value of Logic 0 or Logic 1. The noise reduction circuit comprises a Fast Fourier Transform (FFT) circuit for receiving the multi-carrier signal and generating frequency-domain component signals. A sampling circuit generates a first sequence of samples of the frequency-domain component signals. A controller identifies samples in the first sample sequence corresponding to Logic 0 chips and identifies samples in the first sample sequence corresponding to Logic 1 chips. A randomizing circuit generates a second sample sequence by shifting positions within the first sample sequence of some of the identified samples corresponding to Logic 0 chips, or by shifting positions within the first sample sequence of some of the identified samples corresponding to Logic 1 chips.

22 Claims, 5 Drawing Sheets

APPARATUS AND METHOD FOR IMPROVING SIGNAL-TO-NOISE RATIO IN A MULTI-CARRIER CDMA COMMUNICATION SYSTEM

TECHNICAL FIELD OF THE INVENTION

The present invention is directed, in general, to wireless communications devices and, more specifically, to an RF receiver having a lower signal-to-noise ratio.

BACKGROUND OF THE INVENTION

Wireless communications systems, including cellular phones, paging devices, personal communication services (PCS) systems, and wireless data networks, have become ubiquitous in society. Wireless service providers continually try to create new markets for wireless devices and to expand existing markets by making wireless devices and services cheaper and more reliable. The price of end-user wireless devices, such as cell phones, pagers, PCS systems, and wireless modems, has been driven down to the point where these devices are affordable to nearly everyone and the price of a wireless device is only a small part of the end-user's total cost. To continue to attract new customers, wireless service providers concentrate on reducing infrastructure costs and operating costs, and on increasing handset battery lifetime, while improving quality of service in order to make wireless services cheaper and better.

To maximize usage of the available bandwidth, a number of multiple access technologies have been implemented to allow more than one subscriber to communicate simultaneously with each base station (BS) in a wireless system. These multiple access technologies include time division multiple access (TDMA), frequency division multiple access (FDMA), and code division multiple access (CDMA). These technologies assign each system subscriber to a specific traffic channel that transmits and receives subscriber voice/data signals via a selected time slot, a selected frequency, a selected unique code, or a combination thereof.

CDMA technology is used in wireless computer networks, paging (or wireless messaging) systems, and cellular telephony. In a CDMA system, mobile stations (e.g., pagers, cell phones, laptop PCs with wireless modems) and base stations transmit and receive data in assigned channels that correspond to specific unique codes. For example, a mobile station may receive forward channel data signals from a base station that are convolutionally coded, formatted, interleaved, spread with a Walsh code and a long pseudo-noise (PN) sequence. In another example, a base station may receive reverse channel data signals from the mobile station that are convolutionally encoded, block interleaved, modulated by a 64-ary orthogonal modulation, and spread prior to transmission by the mobile station. The data symbols following interleaving may be separated into an in-phase (I) data stream and a quadrature (Q) data stream for QPSK modulation of an RF carrier. One such implementation is found in the TIA IS-95 CDMA standard. Another implementation is the TIA S-2000 standard.

In order to increase the reliability of CDMA receivers, base stations and wireless terminals frequently transmit M copies of the same signal, staggered in time, to the other device. The receiving device typically uses multiple receive paths, such as in a rake receiver, to capture each of the copies. The captured copies are summed to produce a composite signal in order to improve the signal to noise ratio. This allows the composite signal to be more easily de-spread and recognized by a signal correlator or matched filter. However, this approach requires a large number of components and a large circuit area. Additionally, the repeated transmission of M copies of the same signal is wasteful of scarce bandwidth.

Furthermore, wireless digital communication systems increasingly are using multicarrier CDMA (MC-CDMA) and orthogonal frequency division multiplexing (OFDM) CDMA. In OFDM-CDMA, different wireless terminals (or mobile stations) are allocated different frequency spreading codes. The advantage of OFDM-CDMA is that the number of codes assigned to each wireless terminal is adjustable, leading to different data rates for different wireless terminals. However, the fact that each wireless terminal must transmit its signal over the entire spectrum leads to an averaged-down effect in the presence of deep fading and narrowband interference.

U.S. Pat. No. 6,683,908 to Cleveland disclosed an apparatus and a method that eliminate the need to transmit M copies of the same signal in order to improve signal reception. The teachings of U.S. Pat. No. 6,683,908 are hereby incorporated by reference into the present application as if fully set forth herein.

The apparatus and method of U.S. Pat. No. 6,683,908 eliminate the need to transmit M copies of the same signal by storing in memory an original copy of the received signal and generating pseudo-replicas using the stored samples of the original received signal. Each pseudo-replica is generated by randomly interchanging samples of the original received signal that occurred during time slots of the original received signal that correspond to Logic 1 and by randomly interchanging signal samples that occurred during time slots of the original received signal that correspond to Logic 0. The original signal and one or more pseudo-replicas are then combined to form a composite signal that has an improved signal-to-noise ratio (SNR).

The SNR is improved because noise in communication systems is not coherent and tends to cancel when the pseudo-replicas are repeatedly added together. But the signal is coherent and the signal components tend to add together as the pseudo-replicas are repeatedly added together. Thus, the SNR improves.

However, the apparatus and method of U.S. Pat. No. 6,683,908 operate on samples from time domain signals. This is not ideally suited for the frequency domain signals that are present in MC-CDMA and OFDM-CDMA receivers.

There is therefore a need in the art for improved multi-carrier CDMA communication systems that have an improved signal-to-noise ratio in the receiver. In particular, there is a need for multi-carrier CDMA communication systems that are not required to transmit multiple copies of a signal in order to improve SNR in the receiver.

SUMMARY OF THE INVENTION

The present invention improves the detection and demodulation of digital data in multi-carrier CDMA (MC-CDMA) communication systems and OFDM-CDMA communication systems. The present invention may be implemented in any system that employs frequency division duplexing (FDD) or time division duplexing (TDD). This present invention reduces the required energy per chip in processing multiple, reconstructed samples of the received signal. This allows a CDMA receiver to operate closer to the Shannon limit. The method is very useful for improved reception of overhead signals in systems employing smart antenna technology, where the transmission of overhead signals does not employ adaptive beam forming.

To address the above-discussed deficiencies of the prior art, it is a primary object of the present invention to provide, for use in a multi-carrier CDMA receiver, a noise reduction circuit for improving a signal-to-noise ratio of a multi-carrier signal corresponding to a predetermined sequence of chips, each of the chips having a value corresponding to Logic 0 or Logic 1. According to an advantageous embodiment of the present invention, the noise reduction circuit comprises: 1) a Fast Fourier Transform (FFT) circuit capable of receiving the multi-carrier signal and generating a plurality of frequency-domain component signals; 2) a sampling circuit capable of generating a first sequence of samples of the frequency-domain component signals; 3) a controller capable of identifying samples in the first sequence of samples corresponding to Logic 0 chips and identifying samples in the first sequence of samples corresponding to Logic 1 chips; and 4) a randomizing circuit. The randomizing circuit generates a second sequence of samples by at least one of: i) shifting positions within the first sequence of samples of at least some of the identified samples corresponding to Logic 0 chips, wherein each of the shifted samples corresponding to Logic 0 chips is shifted from a first position corresponding to a Logic 0 chip to a second position corresponding to a Logic 0 chip; and ii) shifting positions within the first sequence of samples of at least some of the identified samples corresponding to Logic 1 chips, wherein each of the shifted samples corresponding to Logic 1 chips is shifted from a first position corresponding to a Logic 1 chip to a second position corresponding to a Logic 1 chip.

According to one embodiment of the present invention, the frequency-domain component signals comprise a plurality of sinc functions.

According to another embodiment of the present invention, the noise reduction circuit further comprises a combiner circuit for adding the first and second sequences of samples to generate a composite sequence of samples having a reduced signal-to-noise ratio.

According to still another embodiment of the present invention, the noise reduction circuit further comprises a parallel-to-serial converter circuit for converting the composite sequence of samples to the predetermined sequence of chips.

According to yet another embodiment of the present invention, the multi-carrier CDMA receiver is disposed in a base station of a wireless network.

According to a further embodiment of the present invention, the CDMA receiver is disposed in a mobile station capable of communicating with a wireless network.

According to a still further embodiment of the present invention, the randomizing circuit shifts positions of the at least some of the identified samples corresponding to Logic 0 chips according to one of a random process algorithm and a predetermined algorithm.

According to a yet further embodiment of the present invention, the randomizing circuit shifts positions of the at least some of the identified samples corresponding to Logic 1 chips according to one of a random process algorithm and a predetermined algorithm.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless receiver.

Figure 1:
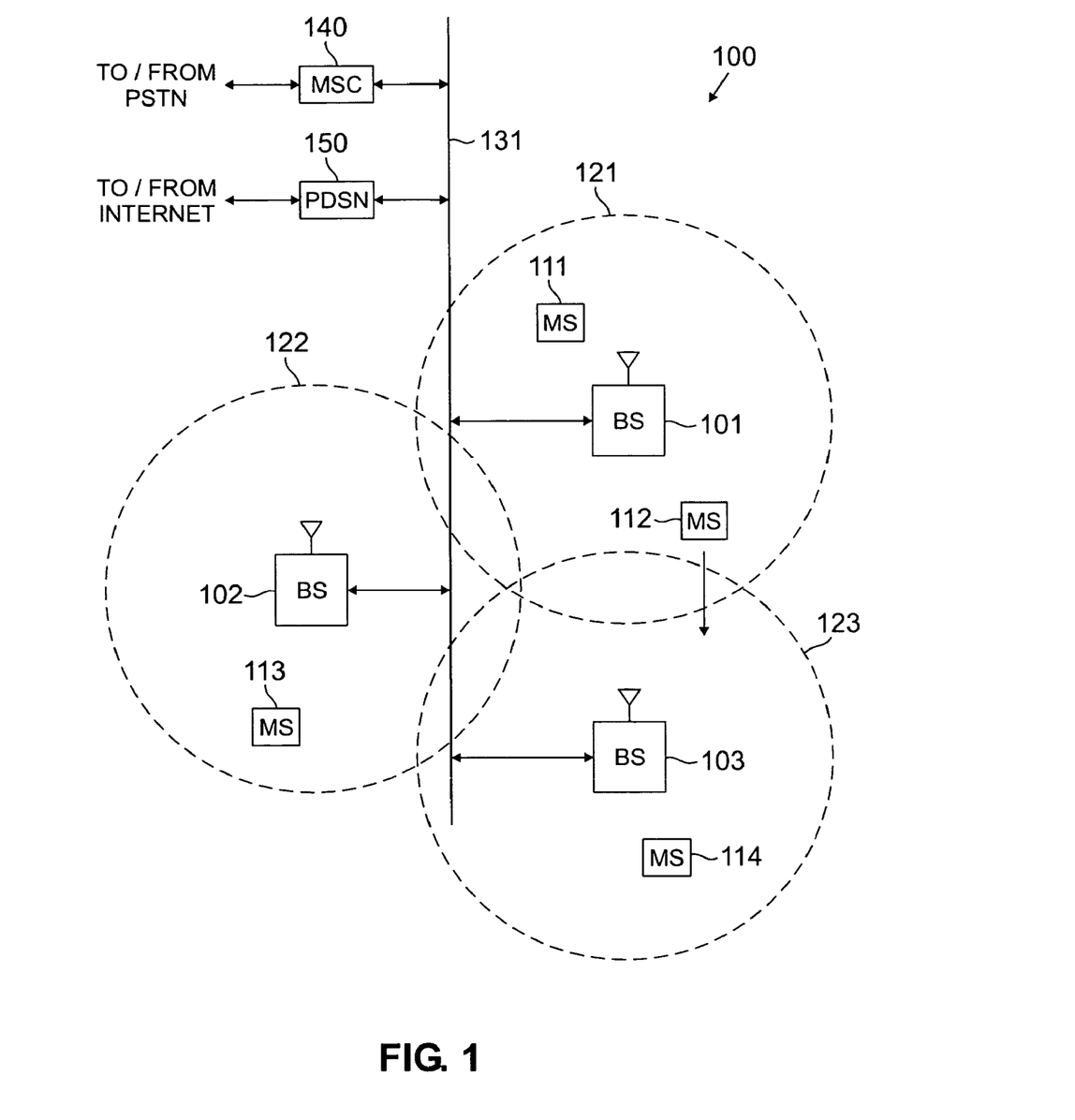
FIG. 1 illustrates an exemplary wireless network that implements wireless receivers according to the principles of the present invention.

FIG. 1 illustrates exemplary wireless network 100, which implements wireless receivers according to the principles of the present invention. Wireless network 100 comprises a plurality of cell sites 121-123, each containing one of the base stations, BS 101, BS 102, or BS 103. According to the principles of the present invention, base stations 101-103 communicate with a plurality of mobile stations (MS) 111-114 using multi-carrier (MC) code division multiple access (CDMA) channels or orthogonal frequency division multiplexing (OFDM) CDMA channels. In an advantageous embodiment of the present invention, mobile stations 111-114 are capable of receiving data traffic and/or voice traffic on two or more multi-carrier (MC) CDMA or OFDM-CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

Figure 2:
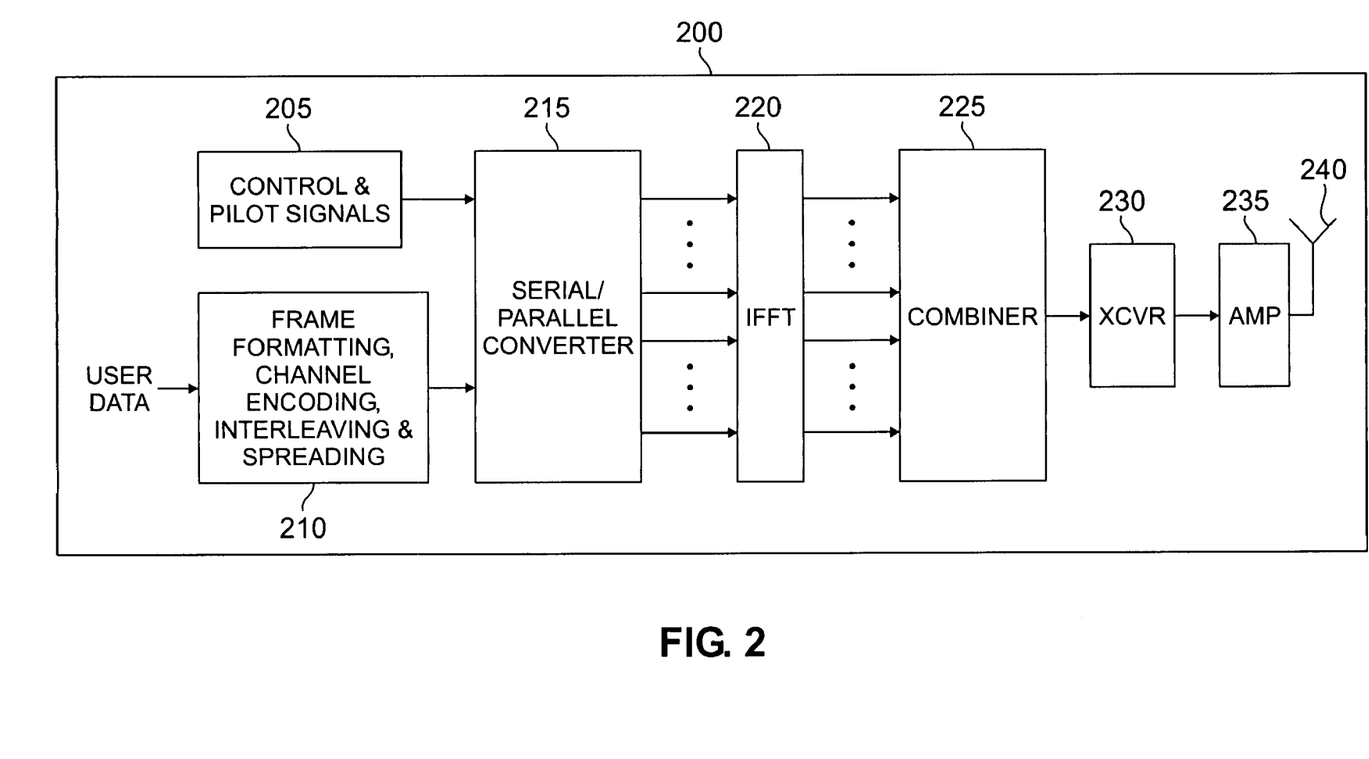
FIG. 2 illustrates a transmit path of a multicarrier CDMA wireless device according to an exemplary embodiment of the present invention.

FIG. 2 illustrates selected portions of the transmit path of multi-carrier (MC) CDMA wireless device 200 according to an exemplary embodiment of the present invention. In FIG. 2, the MC-CDMA wireless device 200 may be, for example, base station (BS) 101 or mobile station (MS) 111. The exemplary architecture of MC-CDMA wireless device 200 is similar to that of conventional MC-CDMA wireless devices.

The transmit path of MC-CDMA wireless device 200 comprises control and pilot signal block 205, frame formatting, channel encoding, interleaving and spreading block 210, serial-to-parallel converter 215, Inverse Fast Fourier Transform (IFFT) block 220, combiner 225, transceiver (XCVR) 230, amplifier 235 and antenna 240. Control and pilot signal block 205 represents conventional circuitry typically found in an MC-CDMA or OFDM-CDMA communication system. Control and pilot signal block 205 generates the pilot signal and other overhead control signals, such as the paging channel signal. Frame formatting, channel encoding, interleaving and spreading block 210 also represents conventional circuitry typically found in an MC-CDMA or OFDM-CDMA communication system. Block 210 receives user data that is to be transmitted and performs such conventional functions as formatting the user data into frames, channel-encoding the formatted data frames, interleaving the encoded data with other data streams, and spreading the user data with, for example, Walsh codes and pseudo-noise (PN) codes.

Serial-to-parallel converter 215 receives the control and pilot signals and the formatted, encoded, interleaved and spread data signal as serial streams of chips having values of Logic 1 and Logic 0. Serial-to-parallel converter 215 converts the serial sequences of chips to parallel chip data that is applied IFFT block 220. IFFT block 220 generates a multi-carrier signal where the presence of a sinc carrier at each output is determined by the existence of a Logic 1 chip at a corresponding input of IFFT block 220.

For example, IFFT block 220 may have eight inputs and may generate eight corresponding sinc function outputs at the frequencies $f_0$, $f_1$, $f_2$, $f_3$, $f_4$, $f_5$, $f_6$, and $f_7$. If IFFT block 220 receives the byte [01100101], then sync carriers are generated at the frequencies $f_1$, $f_2$, $f_5$, and $f_7$. A Logic 1 chip value produces a positive amplitude sinc function (such as in FIG. 5) on a corresponding output of IFFT 220. A Logic 0 chip value produces a negative amplitude sinc function (inverse of FIG. 5) on a corresponding output of IFFT 220.

In the illustrated example, user data signals are represented by a set of $2^N$ sub-carriers and the pilot and control signals are represented by a set of $2^M$ separate sub-carriers. If the sub-carriers are separated in frequency with spacing equal to the inverse of the chip rate, then the IFFT output represents an OFDM signal. Combiner 225 sums the multiple sub-carriers prior to up-conversion to the transmission frequency by transceiver 230. Amplifier 235 amplifies the up-converted RF signal prior to transmission by antenna 240. For operation in TDD mode, combiner 225 inserts a guard interval (GI) in the signal.

Figure 3:
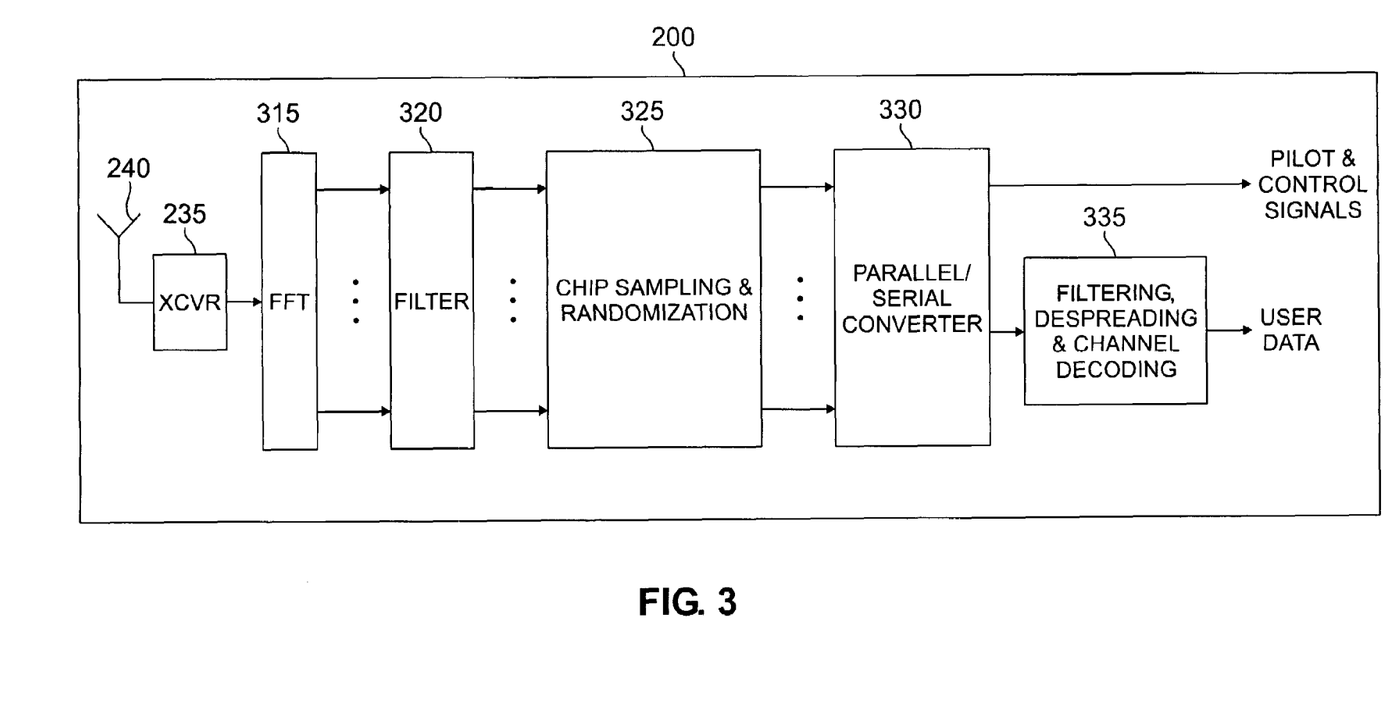
FIG. 3 illustrates a receive path of a multicarrier CDMA wireless device according to an exemplary embodiment of the present invention.

FIG. 3 illustrates selected portions of the receive path of multi-carrier (MC) CDMA wireless device 200 according to an exemplary embodiment of the present invention. The receive path of MC-CDMA wireless device 200 comprises antenna 240, transceiver 235, Fast Fourier Transform (FFT) block 315, matched filter 320, chip sampling and randomization block 325, parallel-to-serial converter 330, and filtering, despreading and channel decoding block 335. Transceiver 235 amplifies and down-converts the RF signal received from antenna 240 and applies the down-converted signal to FFT block 315.

Figure 5:
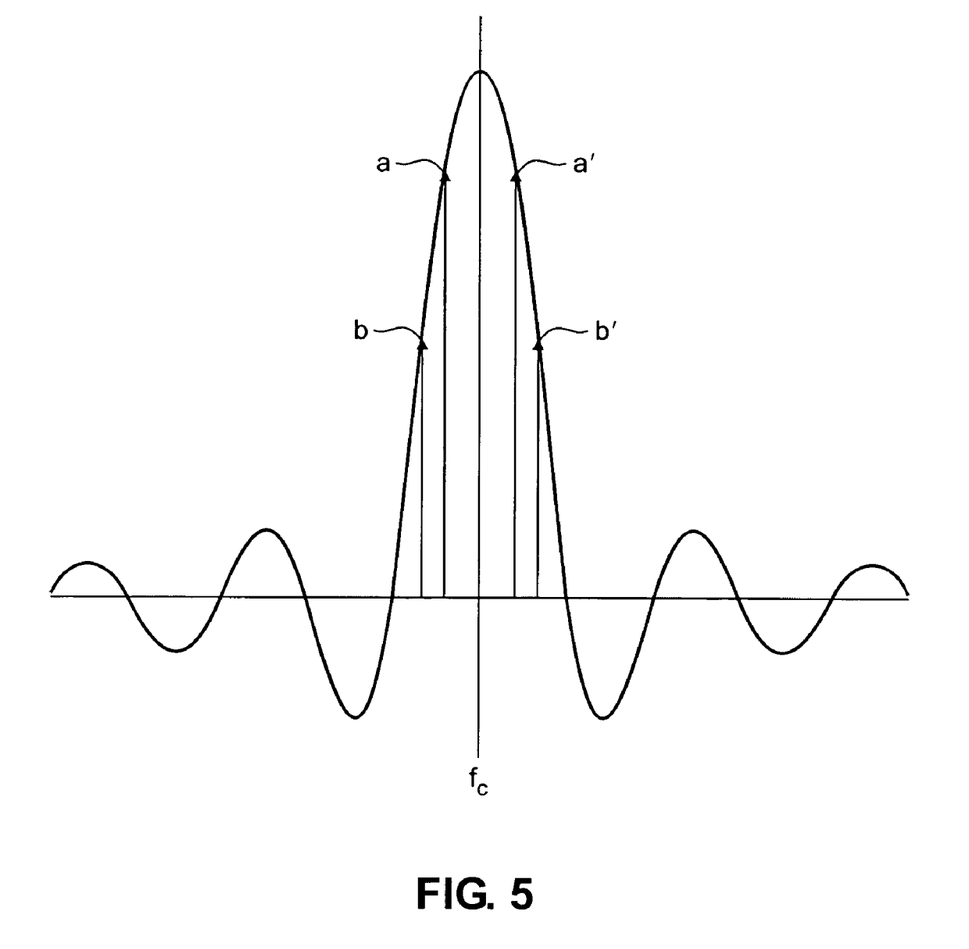
FIG. 5 illustrates the spectrum of the MC-CDMA transmitted signal in which digital modulation in the time domain produces offset sinc functions in the frequency domain.

FFT block 315 digitizes the down-converted signal and produces a sampled spectrum of the multi-carrier signal that represents the spread user data and pilot/control signals. For digital modulation, each multi-carrier spectral component on each output of FFT block 315 has the form of a sinc function centered on frequency $f_c$ as shown in FIG. 5. FIG. 5 illustrates the spectrum of the MC-CDMA transmitted signal in which digital modulation in the time domain produces offset sinc functions in the frequency domain, as given by the equation:

$$\mathrm{sinc}(fT) = \frac{\sin(\pi fT)}{\pi fT}.$$

The outputs of FFT block 315 are filtered by matched filter 320 and the filtered outputs are applied to the inputs of chip sampling and randomization block 325. Chip sampling and randomization block 325 creates randomized pseudo-replicas of the original sampled multi-carrier signal according to the principles of the present invention. Chip sampling and randomization block 325 also combines the original sampled multi-carrier signal and the pseudo-replica signal and outputs the result to parallel-to-serial converter 330.

Ideally, the outputs of parallel-to-serial converter 330 are the pilot and control signals and the same chip sequence that is output by frame formatting, channel encoding, interleaving and spreading block 210 in FIG. 2. Filtering, despreading, and channel decoding block 335 comprises conventional circuitry that reverses the spreading, interleaving, channel encoding, and formatting processes performed by frame formatting, channel encoding, interleaving and spreading block 210 to thereby generate the original user data.

According to the principles of the present invention, interchanging samples of equivalent points in the spectrum, such as Sample(a) and Sample(a') or Sample(b) and Sample(b'), leaves the signal spectrum unchanged. Ideally, a sinc function is symmetric about the center frequency $f_c$, so that Sample(a) is located $\Delta f_1$ below $f_c$ and has the same amplitude as Sample (a'), which is located $\Delta f_1$ above $f_c$. Similarly, Sample(b) is located $\Delta f_2$ below $f_c$ and has the same amplitude as Sample (b'), which is located $\Delta f_2$ above $f_c$.

Hence, randomly distributing equivalent points that correspond to a Logic 1 value across multiple sinc functions in a multi-carrier spectrum leaves the spectral content unchanged. Likewise, randomly distributing equivalent points that correspond to a Logic 0 value across multiple sinc functions in a multi-carrier spectrum leaves the spectral content unchanged. The principle is similar to that described in U.S. Pat. No. 6,683,908 for randomizing time domain samples.

Figure 4:
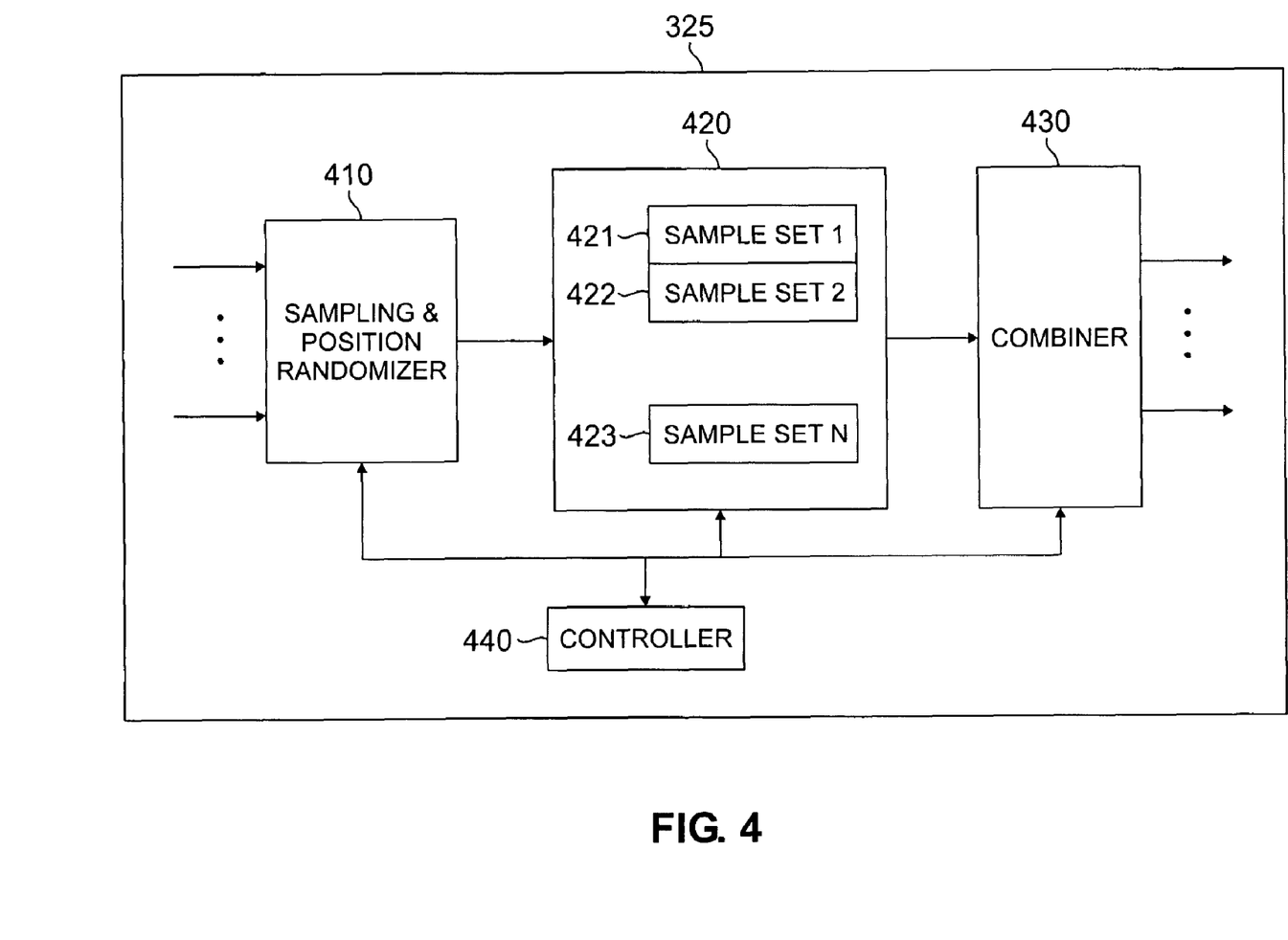
FIG. 4 illustrates an exemplary chip sampling and randomization block in greater detail according to an exemplary embodiment of the present invention.

FIG. 4 illustrates chip sampling and randomization block 325 detail according to one embodiment of the present invention. Chip sampling and randomization block 325 creates randomized replicas of the sampled multi-carrier signal according to the principles of the present invention. Chip sampling and randomization block 325 comprises sampling and position randomizer 410, memory 420, combiner 430 and controller 440.

At the output of FFT block 315, there are J samples for each multi-carrier component (i.e., sinc function) for the sampled I signal and the sampled Q signal. For example, the sinc function in FIG. 5 at frequency $f_1$ may be sampled eight (8) times. The samples of the original signal are stored sequentially in memory 420 in memory block 421, which is labeled "Sample Set 1". To create each randomized pseudo-replica signal, controller 440 first determines the time slots in the time domain pilot channel signal that correspond to a Logic 1 and the time slots that correspond to a Logic 0 in the expected Pseudo-Noise (PN) code and Walsh Code (WC) chip sequence combination. The pilot channel signal is used because the chip sequence for the Pseudo-Noise (PN) code and Walsh Code (WC) of the pilot channel signal are known.

A clock circuit (not shown) synchronizes the start of the sampling processes with the CDMA chip timing, which allows controller 440 to accurately assign a particular sample to a specific time slot in a chip. Controller 440 designates SLOT_1 as the set of time slots for a Logic 1 and designates SLOT_0 as the set of time slots for Logic 0 in the pilot channel PN sequence. Controller 440 uses set SAMPLE_1 to identify the set of sampled locations obtained for the corresponding Logic 1 time slots and uses set SAMPLE_0 to identify the set of sampled locations obtained for the corresponding Logic 0 time slots. Controller 440 randomly places the sampled locations contained in SAMPLE_1 in the time slots of SLOT_1 and the sampled locations in SAMPLE_0 in the time slots designated in SLOT_0. The result is a pseudo-replica signal in which the original sample positions corresponding to Logic 1 are randomly redistributed among Logic 1 time slots and those corresponding to Logic 0 are randomly redistributed among Logic 0 time slots. The randomized samples of the new pseudo-signal are stored in memory block 422, labeled "Sample Set 2". Controller 440 may then repeat the randomization process described above to generate up to N pseudo-replica signals that are stored in other memory blocks, such as memory block 423, labeled "Sample Set N".

At the conclusion of J chip time-intervals, there are N sampled signals for which the samples corresponding to expected Logic 1 values are randomly distributed among expected Logic 1 positions. At the conclusion of J chip time-intervals, there are N sampled signals for which the samples corresponding to expected Logic 0 values are randomly distributed among expected Logic 0 positions. It is noted that if the received signal is time-aligned with the expected code sequence of the pilot signal, then randomly placing the Logic 1 samples within the SAMPLE_1 positions does not change the received chip sequences. Similarly, randomly placing the Logic 0 samples within the SAMPLE_0 positions does not change the received chip sequence in this case.

Upon acquiring JxK samples, controller 400 instructs combiner 430 to sum the N replicas and despread the reconstructed signal with a correlator or matched filter. For the case where the sampled signal is time aligned with the expected PN code and Walsh code sequences, the summation by controller 400 results in coherent combining of the desired signal components and non-coherent combining of the undesired noise and interference components. The result is improved Ec/No for better detection performance. By creating randomized signal pseudo-replicas of each sample, the processing time is reduced over previous methods. Improvement of the Ec/No improves the Eb/No value at the matched filter output, which provides operation closer to the Shannon limit.

The present invention improves the performance of wireless digital communications systems by: 1) reducing the required $E_b/N_o$ at the CDMA receiver and detector; 2) reducing the impact of multipath delay on inter-symbol interference; 3) reducing the transmit power required by transmitters for reliable transmission; 4) reducing the interference caused by multiple transmitters in the assigned spectrum; and 5) reducing the battery power required for mobile subscribers in a wireless communications system. It will have a particularly beneficial effect on spectrum utilization by communications systems that employ code division multiple access (CDMA) techniques where all transmitters use the same spectrum by reducing potential interference from other users.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a multi-carrier CDMA receiver, a noise reduction circuit for improving a signal-to-noise ratio of a multi-carrier signal corresponding to a predetermined sequence of chips, each of said chips having a value corresponding to Logic 0 or Logic 1, said noise reduction circuit comprising:
   a Fast Fourier Transform (FFT) circuit capable of receiving said multi-carrier signal and generating a plurality of frequency-domain component signals;
   a sampling circuit capable of generating a first sequence of samples of said frequency-domain component signals;
   a controller capable of identifying samples in said first sequence of samples corresponding to Logic 0 chips and identifying samples in said first sequence of samples corresponding to Logic 1 chips; and
   a randomizing circuit capable generating a second sequence of samples by at least one of:
      shifting positions within said first sequence of samples of at least some of said identified samples corresponding to Logic 0 chips, wherein each of said shifted samples corresponding to Logic 0 chips is shifted from a first position corresponding to a Logic 0 chip to a second position corresponding to a Logic 0 chip; and
      shifting positions within said first sequence of samples of at least some of said identified samples corresponding to Logic 1 chips, wherein each of said shifted samples corresponding to Logic 1 chips is shifted from a first position corresponding to a Logic 1 chip to a second position corresponding to a Logic 1 chip.

2. The noise reduction circuit as set forth in claim 1 wherein said frequency-domain component signals comprise a plurality of sinc functions.

3. The noise reduction circuit as set forth in claim 1 further comprising a combiner circuit for adding said first and second sequences of samples to generate a composite sequence of samples having a reduced signal-to-noise ratio.

4. The noise reduction circuit as set forth in claim 3 further comprising a parallel-to-serial converter circuit for converting said composite sequence of samples to said predetermined sequence of chips.

5. The noise reduction circuit as set forth in claim 4 wherein said multi-carrier CDMA receiver is disposed in a base station of a wireless network.

6. The noise reduction circuit as set forth in claim 4 wherein said CDMA receiver is disposed in a mobile station capable of communicating with a wireless network.

7. The noise reduction circuit as set forth in claim 1 wherein said randomizing circuit shifts positions of said at least some of said identified samples corresponding to Logic 0 chips according to one of a random process algorithm and a predetermined algorithm.

8. The noise reduction circuit as set forth in claim 1 wherein said randomizing circuit shifts positions of said at least some of said identified samples corresponding to Logic 1 chips according to one of a random process algorithm and a predetermined algorithm.

9. A multi-carrier CDMA wireless network comprising a plurality of base stations, each of said base stations comprising a noise reduction circuit for improving a signal-to-noise ratio of a multi-carrier signal corresponding to a predetermined sequence of chips, each of said chips having a value corresponding to Logic 0 or Logic 1, said noise reduction circuit comprising:
   a Fast Fourier Transform (FFT) circuit capable of receiving said multi-carrier signal and generating a plurality of frequency-domain component signals;
   a sampling circuit capable of generating a first sequence of samples of said frequency-domain component signals;
   a controller capable of identifying samples in said first sequence of samples corresponding to Logic 0 chips and identifying samples in said first sequence of samples corresponding to Logic 1 chips; and
   a randomizing circuit capable generating a second sequence of samples by at least one of:
      shifting positions within said first sequence of samples of at least some of said identified samples corresponding to Logic 0 chips, wherein each of said shifted samples corresponding to Logic 0 chips is shifted from a first position corresponding to a Logic 0 chip to a second position corresponding to a Logic 0 chip; and
      shifting positions within said first sequence of samples of at least some of said identified samples corresponding to Logic 1 chips, wherein each of said shifted samples corresponding to Logic 1 chips is shifted from a first position corresponding to a Logic 1 chip to a second position corresponding to a Logic 1 chip.

10. The multi-carrier CDMA wireless network as set forth in claim 9 wherein said frequency-domain component signals comprise a plurality of sinc functions.

11. The multi-carrier CDMA wireless network as set forth in claim 9 further comprising a combiner circuit for adding said first and second sequences of samples to generate a composite sequence of samples having a reduced signal-to-noise ratio.

12. The multi-carrier CDMA wireless network as set forth in claim 11 further comprising a parallel-to-serial converter circuit for converting said composite sequence of samples to said predetermined sequence of chips.

13. The multi-carrier CDMA wireless network as set forth in claim 12 wherein said multi-carrier CDMA receiver is disposed in a base station of a wireless network.

14. The multi-carrier CDMA wireless network as set forth in claim 12 wherein said CDMA receiver is disposed in a mobile station capable of communicating with a wireless network.

15. The multi-carrier CDMA wireless network as set forth in claim 9 wherein said randomizing circuit shifts positions of said at least some of said identified samples corresponding to Logic 0 chips according to one of a random process algorithm and a predetermined algorithm.

16. The multi-carrier CDMA wireless network as set forth in claim 9 wherein said randomizing circuit shifts positions of said at least some of said identified samples corresponding to Logic 1 chips according to one of a random process algorithm and a predetermined algorithm.

17. For use in a multi-carrier CDMA receiver, a method of improving a signal-to-noise ratio of a multi-carrier signal corresponding to a predetermined sequence of chips, each of the chips having a value corresponding to Logic 0 or Logic 1, the method comprising the steps of:

in a Fast Fourier Transform (FFT) circuit, receiving the multi-carrier signal and generating a plurality of frequency-domain component signals;

generating a first sequence of samples of the frequency-domain component signals;

identifying samples in the first sequence of samples corresponding to Logic 0 chips and identifying samples in the first sequence of samples corresponding to Logic 1 chips; and generating a second sequence of samples by at least one of:

shifting positions within the first sequence of samples of at least some of the identified samples corresponding to Logic 0 chips, wherein each of the shifted samples corresponding to Logic 0 chips is shifted from a first position corresponding to a Logic 0 chip to a second position corresponding to a Logic 0 chip; and shifting positions within the first sequence of samples of at least some of the identified samples corresponding to Logic 1 chips, wherein each of the shifted samples corresponding to Logic 1 chips is shifted from a first position corresponding to a Logic 1 chip to a second position corresponding to a Logic 1 chip.

18. The method as set forth in claim 17 wherein the frequency-domain component signals comprise a plurality of sinc functions.

19. The method as set forth in claim 17 further comprising the step of adding the first and second sequences of samples to generate a composite sequence of samples having a reduced signal-to-noise ratio.

20. The method as set forth in claim 19 further comprising the step of converting the composite sequence of samples from parallel data to the predetermined sequence of chips.

21. The method as set forth in claim 17 wherein the step of shifting positions within the first sequence of samples of at least some of the identified samples corresponding to Logic 1 chips comprises the step of shifting positions of the at least some of the identified samples corresponding to Logic 1 chips according to one of a random process algorithm and a predetermined algorithm.

22. The method as set forth in claim 17 wherein the step of shifting positions within the first sequence of samples of at least some of the identified samples corresponding to Logic 0 chips comprises the step of shifting positions of the at least some of the identified samples corresponding to Logic 0 chips according to one of a random process algorithm and a predetermined algorithm.

* * * * *